United States Patent [19]

Gernelle

[11] 4,364,681

[45] Dec. 21, 1982

[54] PRINTER HAVING A LINEAR MOTOR

[75] Inventor: François Gernelle, Le Chesnay, France

[73] Assignee: Compagnie Internationale Pour l'Informatique CII-Honeywell Bull

[21] Appl. No.: 161,149

[22] Filed: Jun. 19, 1980

[30] Foreign Application Priority Data

Jun. 19, 1979 [FR] France .............................. 79 15627

[51] Int. Cl.³ .............................................. B41J 19/30
[52] U.S. Cl. ................................... 400/322; 318/119; 101/93.16; 400/124
[58] Field of Search ................ 400/124, 322; 318/135; 310/13–15; 101/93.16, 93.29–93.34, 93.48, 93.04–93.05

[56] References Cited

U.S. PATENT DOCUMENTS

| | | | |
|---|---|---|---|
| 3,509,981 | 5/1970 | Hylan et al. | 400/322 |
| 3,618,514 | 11/1971 | Nyman | 400/119 X |
| 3,641,583 | 2/1972 | Cless et al. | 346/29 |
| 3,688,035 | 8/1972 | Cless | 178/33 R |
| 3,696,204 | 10/1972 | Wallskog | 178/27 |
| 3,867,675 | 2/1975 | Kitz et al. | 318/119 |
| 3,924,528 | 12/1975 | Ludin | 101/93.16 X |
| 4,044,881 | 8/1977 | Chai et al. | 400/279 |
| 4,072,101 | 2/1978 | Garcia et al. | 101/93.15 |
| 4,074,067 | 2/1978 | Speckhard | 400/124 X |
| 4,248,148 | 2/1981 | Mahoney et al. | 101/193.48 X |

FOREIGN PATENT DOCUMENTS 2093848 1/1972 France .
2219011 9/1974 France .

Primary Examiner—Edward M. Coven
Attorney, Agent, or Firm—Lowe, King, Price & Becker

[57] ABSTRACT

A linear motor for driving a dot printer head includes a carriage carrying a print head. The carriage is displaced by a drive system on a linear guide rail. The drive system is a linear motor having an armature wound on a support situated on the carriage. The motor includes an armature winding in a magnetic circuit including the rail.

8 Claims, 10 Drawing Figures

PRINTER HAVING A LINEAR MOTOR

TECHNICAL FIELD

The present invention relates to a dot type printer and more particularly to a carriage bearing a printing head and displacable by a drive system on a linear guide rail.

BACKGROUND ART

Various types of printers have been developed for printing data contained in or treated by a computer. The printers apply characters to paper or other types of data recording carriers in response to signals from the computer. The printers include systems for guiding the paper and controlling the motion of the print head across the sheet. The print systems are frequently distinguished as mechanical printers and electrostatic or xerographic printers.

In the case of mechanical printers, principally of the drum type, flying type, line by line type, etcetera, a disadvantage is that the printing system drive device is relatively heavy and therefore has considerable inertia. The relatively high inertia adversely affects the accuracy of the printing head positioning, necessitating a very efficient and considerable servo-control for the position and speed of a head for the printer. These factors pose problems notably in the case of so-called high speed printers where the printing speed is very fast. This is particularly the case with so-called "dot" printers in which each character or symbol is formed by successive and/or simultaneous hits or strikes of sets of dots, which together represent a character.

The present invention, therefore, has as its object the development of a high speed printer, particularly of the dot type, in which a guide device for the print head is very much lighter than devices of known type and has a relatively low inertia, while permitting a considerable reduction in the mechanical system and offering greater ease of operation.

DISCLOSURE OF INVENTION

The problem is resolved according to the invention in a printer of the type mentioned above including a carriage for a printing head and displaced by a drive system on a linear guide rail, by providing a linear motor having an armature wound on the carriage and a winding in a magnetic circuit including the guide rail.

The concept on which the invention is based involves utilizing a linear motor instead of the usual, relatively heavy and cumbersome mechanical motor used in this type of apparatus. The armature of the linear motor is wound on the carriage carrying the printing head. The guide rail which is usual in these devices is used both as a support and as part of the field or inductor system of the linear motor, since it is made of a material having high magnetic permeability. A further feature of the invention is to use a permanent magnetic field of the linear motor produced by a magnetic circuit both as an excitation field for the motor winding and as an excitation field for printing hammers carried by the printing head; the magnetic field performs these two functions simultaneously. This is possible because the windings are positioned to be permanently in the field of the linear motor. The activation of the hammers is caused by the derivation of a displacement force in response to a current being supplied to the control windings for activation of the said hammers.

As one additional feature of the invention, the control winding of each hammer is formed by contiguous turns situated in a plane perpendicular to the lines of the magnetic field of the linear motor.

According to another feature of the invention, the magnetic circuit is constituted by a closed yoke, having one longitudinal arm formed by the guide rail. The yoke encloses a magnet separated from the rail by an air gap and attached on its other side to another longitudinal arm of the yoke. Furthermore, the air gap can extend the length of the rail.

Apart from the simplicity of its construction and its improved reliability, the printer of the present invention comprises a print device of smaller size with regard to known apparatus of this type and is very light, which is very important to provide increased head speed. The light weight is also important to accurately stop the head as close as possible to the required position, to reduce problems of position servo-control.

The above and still further objects, features and advantages of the present invention will become apparent upon consideration of the following detailed description of one specific embodiment thereof, especially when taken in conjunction with the accompanying drawings.

BEST MODE FOR CARRYING OUT THE INVENTION

Figure 1:
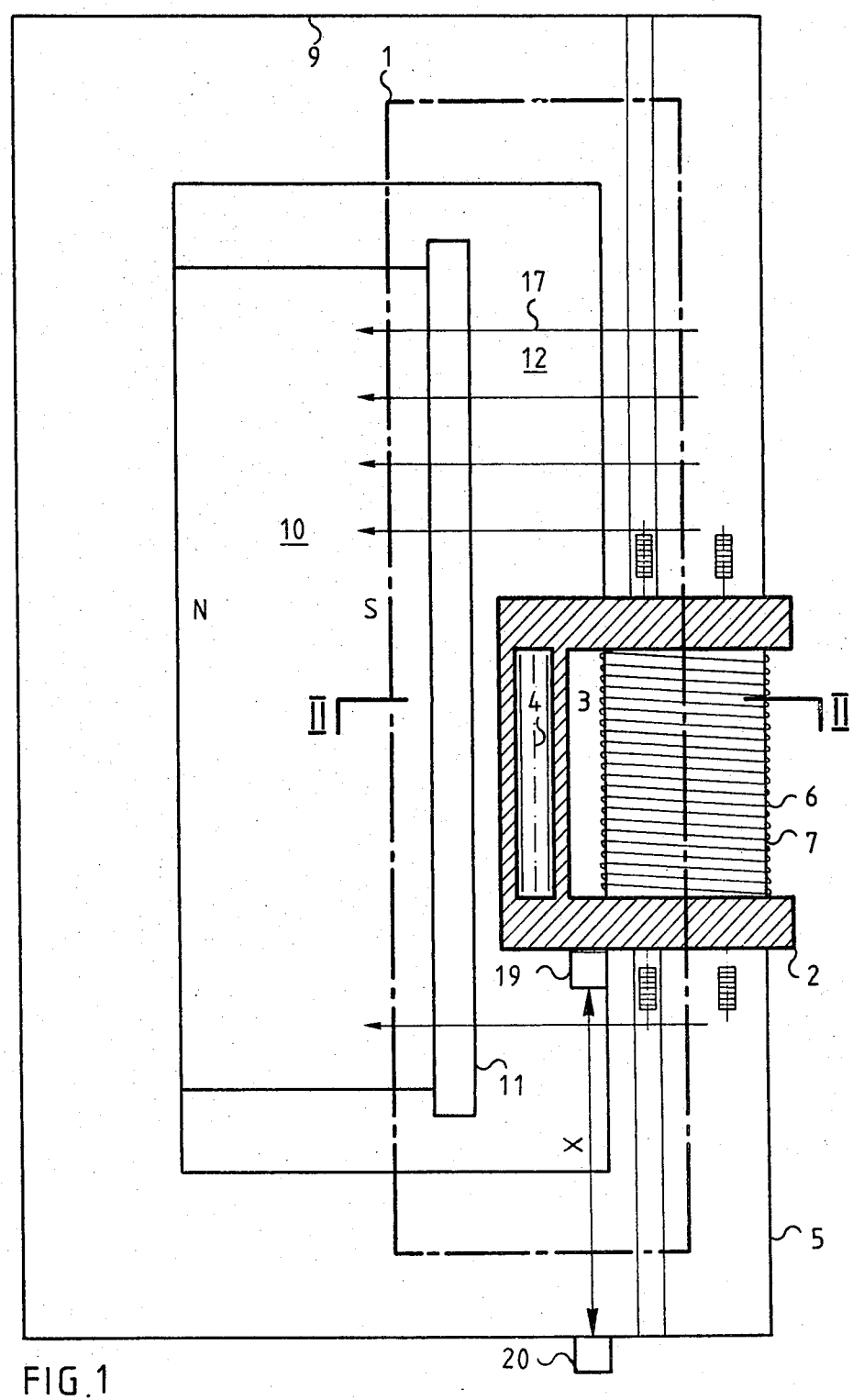
FIG. 1 is a partial schematic top view of one embodiment of a printer according to the invention, showing basically the printing device and its drive system.
Figure 2:
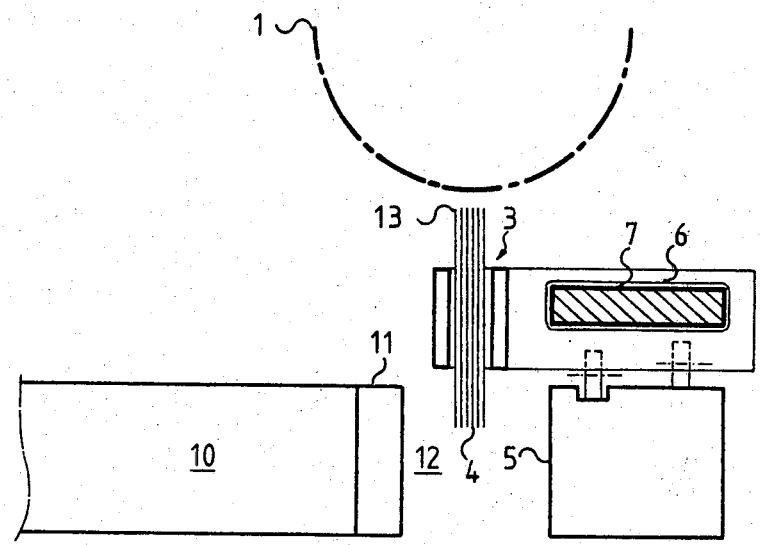
FIG. 2 is a schematic cross section of the device of FIG. 1, taken along the lines II—II of FIG. 1.

In FIGS. 1 and 2 are schematically shown the parts of the printer which are important for understanding the invention. The printer, basically of the dot type, comprises a cylinder 1 indicated by dot and dash lines. Carriage 2 is translated rectilinearly in front of cylinder 1. Carriage 2 carries print head 3 which includes several, typically seven, side by side print hammers 4. Carriage 2 is translated on a rectilinear guide rail 5 parallel to cylinder 1. On cylinder 1 is arranged a recording carrier, such as a sheet of paper, which is struck by the hammers of the print head 3.

Carriage 2 is displaced by a DC linear motor having an armature formed by a winding 6 which is wound on a support member 7. In a preferred embodiment, support member 7 is a duralumin rod forming the body of carriage 2. Carriage 2 is guided across guide rail 5 with the aid of an appropriate bearing system (not shown), for example, ball bearings. For this purpose, guide rail 5 is formed by a horizontal metal bar having a square or rectangular section, rectilinear groove in which two of the bearing members on one side of the carriage run; two other bearing members on a second side of the carriage move laterally with a slight off-set in height on the bar or in a second groove. The linear motor induction system includes a magnetic circuit formed by a closed, high magnetic permeability yoke 9, shaped as a rectangular ring. One longitudinal arm of the rectangular ring is formed by the guide rail 5. Yoke 9 encloses a permanent magnet NS 10 having a south (S) pole face abutting against one face of pole piece 11, and having a second face spaced from rail 5 by air gap 12. The north (N) pole face of magnet 10 abuts against and is fixed to the other longitudinal arm of yoke 9, see FIG. 1.

Figure 3:
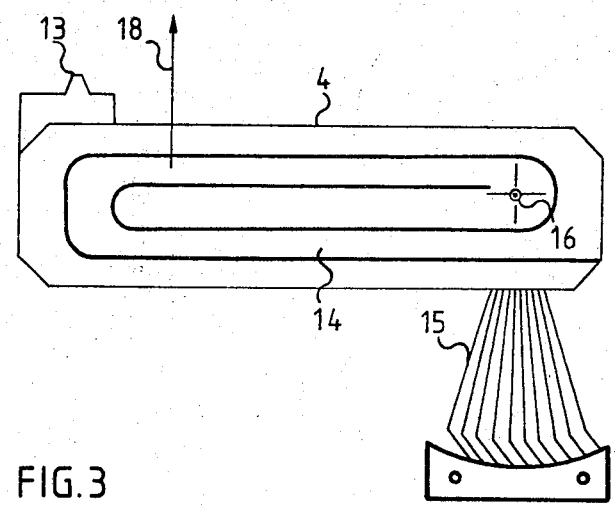
FIG. 3 is a more detailed view of a print member used in the device of FIGS. 1 and 2.

As is seen in FIGS. 1 and 2, print head 3 includes print hammers 4 which are constituted by flat plates. The flat plates have parallel longitudinal axes with immediately adjacent plates having almost abutting faces. Each plate has a pointed end 13 proximate cylinder 1, which end forms the actual dot-striking member. Since these print hammers can be of a known type, for example, as in U.S. Pat. No. 3,971,311, they are shown schematically in FIG. 3. Each print hammer 4 is basically formed by one or more spirals 14 cut from an elongated flat metal plate provided with a pointed protruding part 13 which prints a dot of the character to be represented. Each spiral 14 is connected to a small metal support tongue 15 forming a return spring. Each of tongues 15 is integral with a foot which supplies the hammer with an appropriate excitation current via the tongue. Each hammer is pivotable about horizontal axis 16. According to a preferred embodiment, seven hammers are arranged vertically on the print head (see FIG. 2) and positioned partly or completely in the air gap 12 of the linear motor.

In operation, carriage 2 is driven at a constant speed along guide rail 5 by the described DC linear motor. Each of print hammers 4 is separately activated with adequate control excitation to strike a selected character in the form of a set of dots.

Displacement of carriage 2 is obtained by supplying a control signal to the linear motor. The control signal is an appropriate operating current supplied to armature winding 6, located in air gap 12 of a magnetic field having lines of flux 17 (FIG. 1) extending from guide rail 5 to pole piece 11. The combined action of the operating current which is circulating in winding 6 and of the magnetic field flux lines 17 creates a force for driving carriage 2 either to the right or left along its guide rail 5 depending on the direction of current flow in winding 6. Because air gap 12 extends over the greater part of the length of rail 5, corresponding to the desired length of print on cylinder 1 of the printer, carriage 2 can be driven between opposite sides of yoke 9. Control of the linear motor is effected by a standard amplifier system having symmetrical output. The amplifier is connected to a system for servo-controlling the motor, as described infra. By way of example, the motor operates at a speed of one meter per second.

To control print hammers 4, of the type disclosed in the cited patent, it is necessary for the hammers to be placed in a uniform magnetic field which acts perpendicularly to the longitudinal axes thereof so that the action of the excitation current supplied to the flat conducting spirals of the hammers is combined with a permanent magnetic field which is perpendicular to the flat spiral. The current and magnetic field are combined to drive hammers 4 upward, as indicated by arrow 18. Hammers 4 pivot about axis 16 thereof. To pivot hammers 4, the invention uses the permanent field of the linear motor as a magnetic field by arranging the longitudinal axes of the flat hammers perpendicular to lines of flux 17. The current for controlling print hammers 4 is preferably produced by an amplifier with two simultaneously blocked or saturated transistors to produce the desired current as a function of a control signal.

It is to be understood that the print head can be miniaturized by integrating it with the linear motor carrying the print hammers in order to move the hammers completely into the air gap of the linear motor without reducing performance.

The system for detecting the print head location, as well as the systems for servo-control of the speed and position of this print head to provide correct, accurate and reliable operation of the printer, is described next.

In the print head location detection system according to the invention, an ultrasonic transmitter receiver system is used. Thus, as shown in FIGS. 1 and 2, an ultrasonic, acoustic transmitter 19 is placed on one face of translatable print head 3 and a fixed ultrasonic, acoustic receiver 20 is mounted on one side of yoke 9 of the printer. Transmitter 19 is disposed on yoke 9 so as to be aligned with receiver 20 and to move parallel to the guide rail 5. Transmitter 19 is at the same distance as receiver 20 from rail 5 but at a variable distance x from the receiver, whereby as head 3 traverses rail 5, the propagation time of ultrasonic, acoustic energy between the transmitter and receiver is directly proportional to x.

Figure 4:
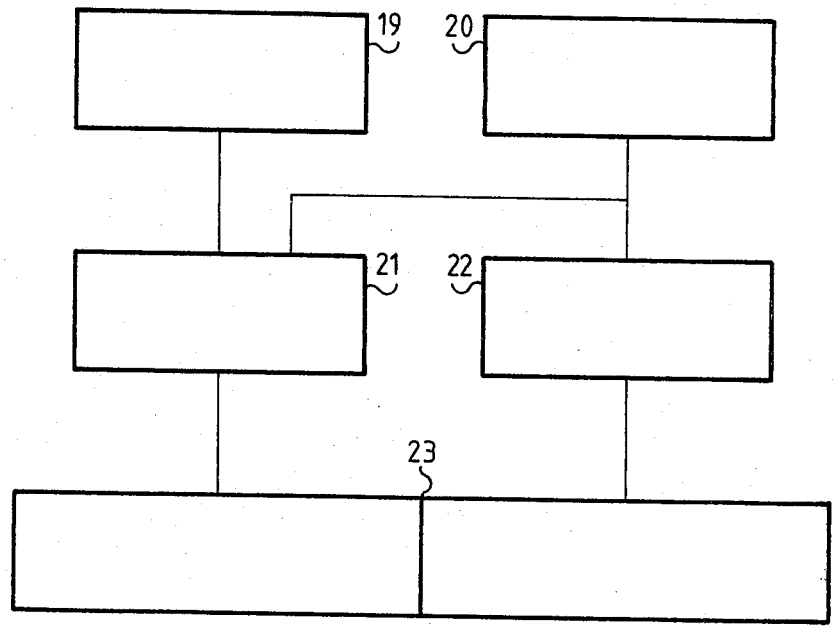
FIG. 4 is a block diagram of a print head location detection system according to the invention.

In FIG. 4 is shown the block diagram of the print head location detection system according to the invention. The principle of location detection involves comparing the phase of the transmitted, continuous wave ultrasonic, acoustic signal with that of the signal received by the receiver. The phase difference is measured by counting the passages through zero of the phase difference and the number of wavelengths λ of the continuous acoustic wave between the transmitter and the receiver; λ is preferably equal to the length of a character in the direction of movement of head 3 across the sheet. In one embodiment, wherein the character length is 2.5 mm, λ=2.5 mm, a result achieved with an acoustic wave frequency of 137 kHz. The effect of this is that each time the phase difference between transmitter 19 and receiver 20 passes through zero, there is a determination of the start of a character. Conventional phase detectors have sufficient resolution to detect distance of 1/64th of a character. According to the system of FIG. 4, phase displacements within the distance of one charaacter, i.e., phase angles within 360 degrees, are detected in phase displacement measuring device 21, responsive to transmitter 19 and receiver 20. To determine the character position of head 3 across the sheet, i.e., the number of characters across the sheet which head 3 is above, the pulse type outputs of receiver 20, one for each received cycle, are supplied to position counter 22 and the position count in device 22 is thus made from the wave received. The outputs of counters 21 and 22 are respectively supplied to fine and coarse segments of binary register 23 having a suitable digital display.

Figure 5:
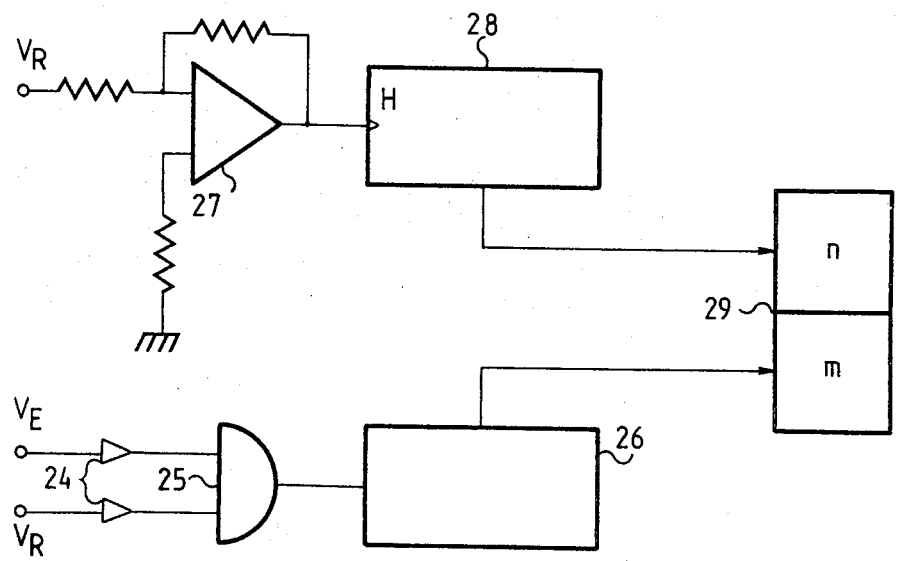
FIG. 5 is a more detailed diagram of an embodiment of the system of FIG. 4.

A preferred embodiment of such a location detection system is shown in FIG. 5. The phase displacement measuring device 21 is formed by standard shaping amplifiers 24 having pulse outputs that drive AND gate 25 having a pulse output which is supplied to counter 26. The position counting device 22 is formed by standard shaping amplifier 27 having a pulse output which is coupled to a clock input, H, of counter 28. The outputs of the counters 26 and 28 are respectively connected to fine and coarse segments m and n of register 29, which serves as a digital display.

The operation of the system for detecting the print head location is now described. Each time the phase difference between the transmitted wave $V_E$ and the received wave $V_R$ is zero, pulses are simultaneously derived from amplifiers 21, causing a pulse to be derived from gate 25. To this end, each of shaper amplifiers 24 produces a relatively short duration pulse in response to each positive going zero crossing of the sinusoidal wave applied to the output thereof; there are two simultaneous positive zero crossings each time carriage 2 is translated a distance equal to the separation between adjacent dot columns on the sheet so each pulse from gate 25 indicates that carriage 2 has traversed a dot column. Furthermore, the position counting system 22 detects each positive going zero crossing of the received signal shaped by the amplifier 27. System 21 supplies the signal derived by it to counter 26 which adds up the number of elementary resolution dots necessary to define a character corresponding to λ and supplies the fine bits, i.e., least significant bits, to the register 29. The output of amplifier 27 is connected to a clock input of counter 28, which stores a count indicative of the number of character spaces which carriage 2 is removed from receiver 20. Counter 28 is preferably a ring counter which is returned to zero each time carriage 2 carrying transmitter 19 returns to the start position at the left of the printer against receiver 20. Counter 28 accumulates the number of periods traversed by the print head and supplies a signal representing the number as a coarse signal having bits with greater significance than those of counter 26 to register 29. Thus, for example, for a character including n dot columns and a head position that is coded to a resolution of 14 bits, counter 26 has a maximum count to n bits of $2^m = n$, while counter 28 has a maximum count of n bits.

According to one embodiment, the phase difference is measured numerically and coded with a 6 bit resolution. The positive zero crossing of the phase difference can be counted with a position coding of 14 bits and visually displayed as 4 hexadecimal digits.

While FIG. 5 is a preferred embodiment, it is to be understood that any other types of circuits, as well as any unusual appropriate device, can be used for the counters.

According to an aspect of the invention, the operating frequency of transmitter 19 is servo-controlled because the propagation speed (v) of an ultrasonic, acoustic wave varies as a function of air temperature, pressure and humidity, all of which are related to wavelength. Therefore, the position measurement is a function of these parameters, which effect the measurement of a phase lag. In effect, when the medium propagating an acoustic wave increases in temperature, the wavelength increases. If there is no compensation, the arrival time of the acoustic wave at receiver 20 provides a false position indication. For example, at 136 kHz, if v=340 m/s (approximately the speed of an acoustic wave in air at 20 degrees C.), the acoustic wavelength is 2.5 mm which corresponds to the length of a printed character. In such a situation, a line having a length of 33 cms can accomodate 132 characters, the position of which is accurately represented by the phase of the wave transduced by receiver 20. If the temperature increases and reaches 40 degrees C., whereby v=347 m/s, the wavelength for an acoustic wave of 136 kHz is v/f=347/136, i.e., around 2.55 mm. In the latter situation, only 129 characters can be counted in a line of 33 centimeters, so there is a substantial error equivalent to a loss of 3 characters. One can therefore understand the importance of servo-controlling the frequency to keep the transmitted wavelength constant.

Figure 6:
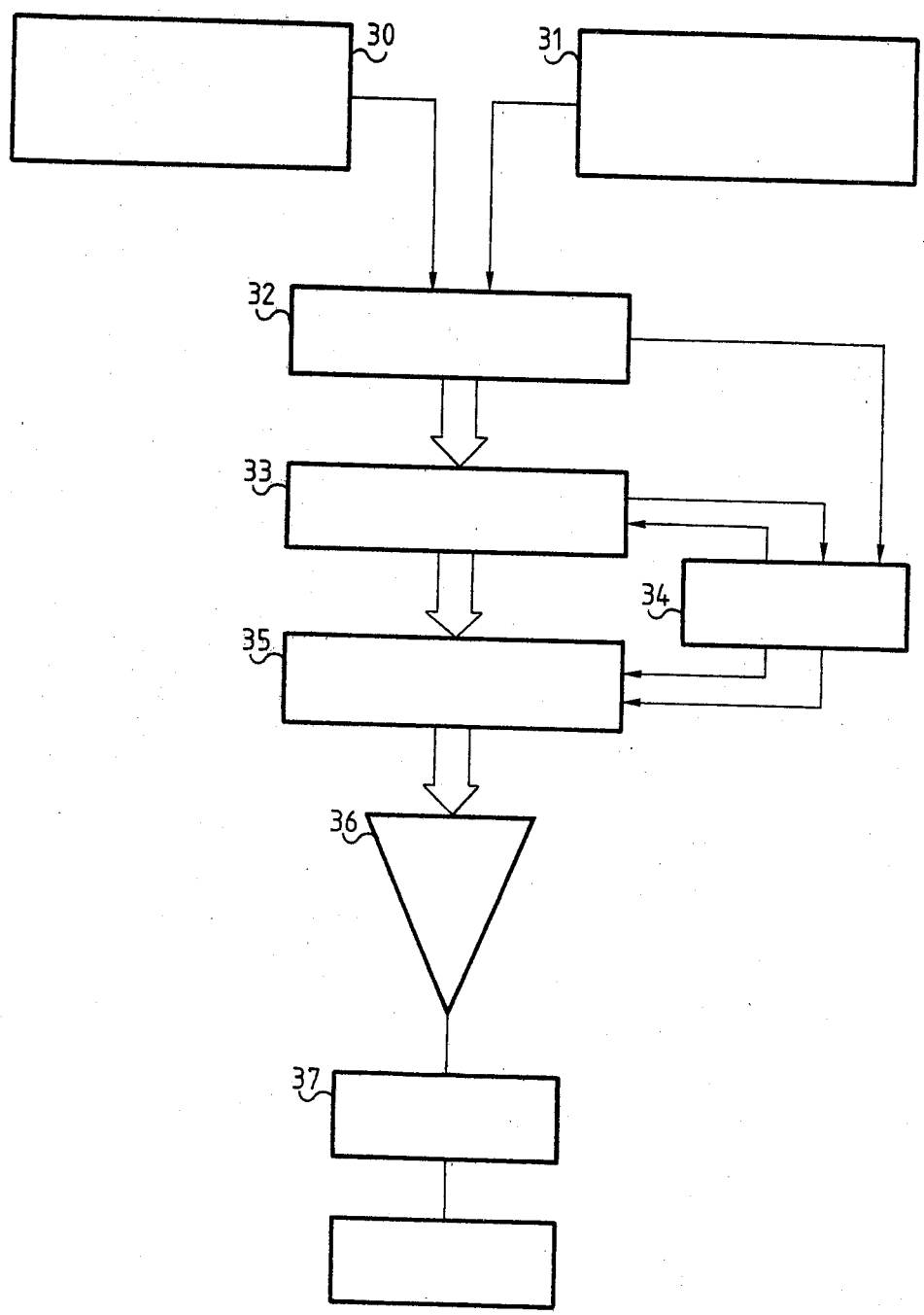
FIG. 6 is a block diagram of a frequency servo-control system used in the system according to the invention.

In the example, the propagation speed, v, of the acoustic wave can reach 347 m/s due to increases in temperature. To keep the wavelength constant it is necessary to increase the frequency of an excitation frequency of transmitter 19. If this frequency is $f = v/\lambda = 347/2.510 - 3 = 138.8$ kHz, there is a variation in frequency of 2.06%. To correct the frequency, a system as illustrated in FIG. 6 is used. Basically a zero position is situated at the starting point of carriage 2, to the left of the carriage track. When carriage 2 arrives at the end of a line, after 33 cm of travel, the position displayed should be 132 characters, i.e., 1,056 dots and 8,448 definition dots, represented as 10000100000000 in binary code and 2100 in hexadecimal.

When the propagation speed varies, the end of line position is different from 2100. Once this difference is measured and transformed into a voltage, it directly corrects the frequency of voltage controlled oscillator 38.

In the preferred embodiment shown in FIG. 6, in order to effect the difference between the indicated position at the end of the line and the hexidecimal number 2100, the indicated position from counters 26 and 28 is stored in memory 30 at the moment when an end of line contact in the form of a microswitch (not shown) is triggered. The constant hexidecimal value of 2100 is subtracted from the stored indicated position in memory 30 by complementing the value of 2100 in complementer 31 and supplying the memory and complementer contents to adder 32. The difference signal derived from adder 32 is applied to counter 33, the contents of which are immediately transferred as a positive or negative value, according to polarity, by a transfer system 34 into a second counter 35. Counter 35 accumulates this difference with a value previously accumulated therein to enable the wavelength to be maintained constant despite successive modifications of the acoustic propagation medium velocity. The contents of counter 35 are converted by a digital to analogue converter 36 into a variable amplitude voltage, the level of which is divided by a fixed amount by potentiometer 37. The ratio voltage derived from potentiometer divider 37 is added to a fixed voltage which corresponds to the non-corrected frequency; the combined voltage controls the frequency of VCO oscillator 38.

The printer according to the invention also includes a system for servo-controlling the print head displacement speed to a constant, predetermined speed as required for proper striking of the sheet by pointed part 13. The speed control system is a digital servo-controller having a reference speed input derived by a control member responsive to a signal indicating whether or not the print head strikes, in which direction the print head moves, or whether it is commanded to stop. The speed measurement involves measuring head displacements over fixed, equal time intervals, established by a time base derived from transmitter 19 of the location detection system. Since the period between cycles of the 137 kHz sine wave derived from transmitter 19 is 7.3 ms, it is necessary to reduce the 137 kHz sine wave frequency before using it to measure the speed. Because the maximum displacement speed of print head 3 in a preferred embodiment is one microsecond, the time taken to go through a point of resolution is of the order of 40 $\mu$s, whereby a measurement made every 7 $\mu$s (the period of transmitter 19) would be largely useless. The transmitter frequency is, therefore, divided by 128 by two counters which reduce the frequency to a value slightly above 1 kHz. Under these conditions, at a head speed of one m/sec, the variation in position between two measurements is 27 points of resolution (1/64th of character), i.e., a variation of the last five bits of a digital word indicating the position, at a speed of 0.3 m/sec there is a displacement of ten points, coded on three bits of position counter 23.

It would, therefore, appear sufficient to consider only the five least significant bits of position counter 23 to determine and control the speed of head 3. However, the seven least significant bits are used because if the speed is slightly greater than 1 m/s, the head displacement between two measurements could exceed five bits, i.e., 32 points of resolution are required if the head speed reaches 1.2 m/s. As a result, it was decided to respond to the seven least significant bits, which allows measurement of the speed up to 2 m/s, which is quite sufficient.

Figure 7:
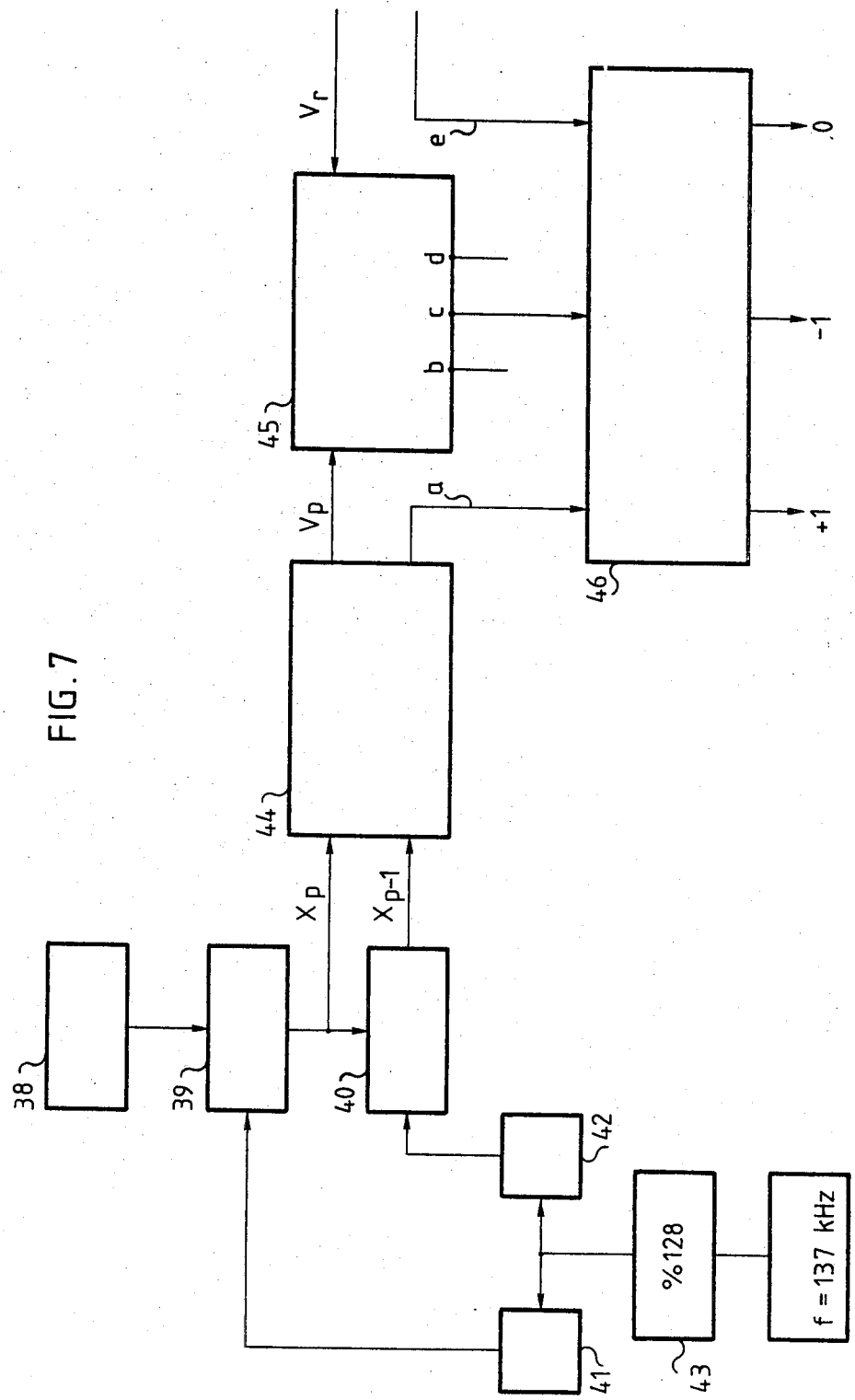
FIG. 7 is a block diagram of a system for servo-controlling the displacement speed of a carriage bearing the print head, according to the invention.
Figures 8, 9:
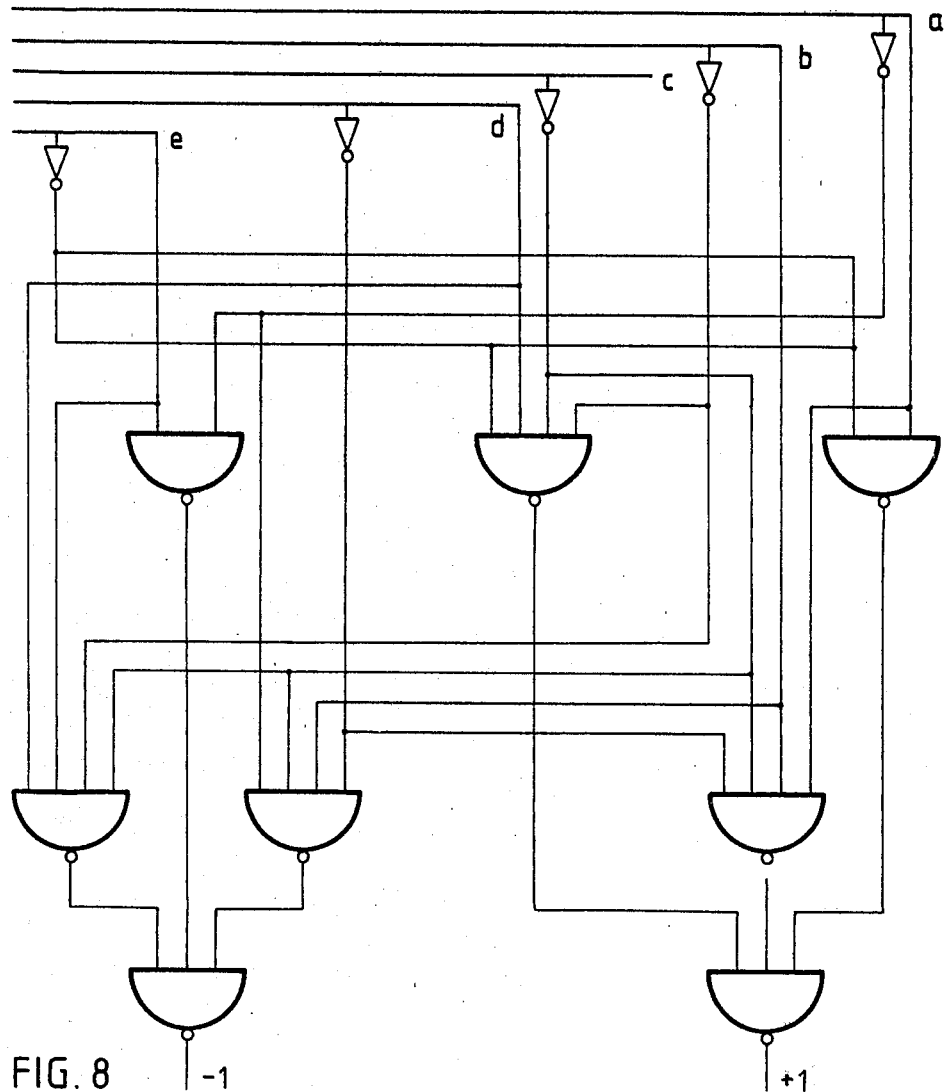
FIG. 8 is a more detailed diagram of a logic network of the FIG. 7 system.
FIG. 9 is the truth table associated with the diagram of FIG. 8.

In FIG. 7, a diagram of a preferred system for servo-controlling the speed of print head 3 is illustrated as including position counter 23. The seven least significant bits to counter 23 are supplied to an output connected to cascaded first and second bistable flip-flop buffers 39 and 40, each of which includes seven stages, one for each of the seven least significant bits of counter 23. Control inputs of flip-flops 39 and 40 are respectively responsive to output signals of NAND gates 41 and 42, in turn responsive to counter 43, forming a divide by 128 frequency divider for the 137 kHz output of transmitter 19. NAND gates 41 and 42 are effectively inverters which derive a pulse type output at a frequency slightly in excess of 1 kHz. Outputs of bistable flip-flops 39 and 40 are connected to a subtracting device 44 having a pulse output which drives one input of serial comparator 45, having a second input responsive to a pulse source having a fixed frequency commensurate with the desired speed of head 3 across the sheet. Comparator 45 derives an output indicative of the frequency difference of the inputs thereof; the output of comparator 45 is coupled to logic network 46, a detailed diagram of which is shown in FIG. 8. Network 46 derives an output signal supplied to standard operation amplifier of a servo-control module for the current supplied to winding 6.

This system operates as follows. At time $t_p$, an indication of the position $x_p$ of print head 3 is derived from the seven stages of bistable flip-flop buffer 39; an indication of the position of $x_{p-1}$ of head 3, i.e., the head position at a previous time $t_{p-1}$, is simultaneously derived from the seven stages of buffer 40. The time $t_p$, when a signal is transferred from counter 23 to buffer 39, corresponds to the trailing edge of the pulse at the output of the NAND gate 41, which edge enables buffer 39 to be loaded. The values of $x_p$ and $x_{p-1}$ derived from buffers 39 and 40 are subtracted in the conventional subtractor 44, formed by two adders and some inverters. The pulse frequency derived from subtractor 44 ($v_p$), representing the actual speed of head 3, is compared in comparator 45 with a reference frequency ($v_r$) fixed by the user, which corresponds to the distance which it is desired for the print head to move between two measuring times $t_p$ and $t_{p-1}$. Logic network 46 responds to the output of comparator 45, a polarity indication for the reference speed and a polarity indication for the head speed, as derived from subtractor 44, to determine if it is necessary to increase or decrease the speed of head 3. When these operations are finished, the position $x_p$ is transferred to the bistable flip-flop buffer 40 and then becomes the preceding position. The transfer time is determined by the NAND gate 42 decoding the phase 1111101 of counter 43 and deriving an enabling signal for an input of buffer 40.

In FIG. 8 is shown, in a more detailed manner, logic network 46 of FIG. 7. Logic network 46 includes an array of NAND gates connected to determine whether the speed of print head 3 is to be increased or decreased. To do this, the following data are available:

(1) input a representing the direction of movement of head 3, as indicated by the polarity of the output of subtractor 44; the one and zero values of a respectively indicate negative and positive measured speed;

(2) input e representing the polarity of the reference speed with the same conventions as for the measured speed; and (3) the outputs b, c and d of comparator 45 indicating the relation between measured speed $v_m$ and reference speed $v_r$; a one value for output bit b of comparator 45 indicates that $v_m$ is greater than $v_r$, a one value for output bit c indicates $v_m$ is equal to small $v_r$ and a one bit value for output bit d indicates $v_m$ is less than $v_r$.

Using these notations, the truth table of the system shown in FIG. 9 is constructed. The functions to be synthesized are:

$X1$ (increase the current to winding
 6) $= +1 = a\bar{e} + bc\bar{d}e + \bar{e}bcd$, $X2$ (decrease the current to winding
 6) $= -1 = \bar{a}c + \overline{abcd} + e\overline{bcd}$, 0 (do not change the current to winding 6) $= \overline{X1 + X2}$.

The construction of the table illustrated in FIG. 9 is simple; in effect, if a and e are the same value, head 3 is moving in the correct direction. It is then sufficient to adjust the measured speed to the reference speed, for example:

$a = 0$, $e = 0$ (displacement in the 0 direction)

$b = 1$, $c = 0$, $d = 0$, $v_m$ greater than $v_0$.

It is therefore necessary to decelerate, a desired value of minus 1. If a and e are not equal, head 3 is moving in the reverse direction to that indicated and it is therefore proper to change the direction of movement; if $a = 1$, $e = 0$, it is necessary to derive the $+1$ signal to obtain a movement in the positive direction. The reverse is true if $a = 0$, $e = 1$.

The X1 and X2 functions are synthesized using NAND gates in the following manner:

$X1 = (a/\bar{e})/(b/\bar{c}/\bar{d}/a)/(\bar{e}/b/c/d)$ $$X2=(\overline{a}/e)/(\overline{a}/b/\overline{c}/d)/(e/\overline{b}/\overline{c}/d).$$

Figure 10:
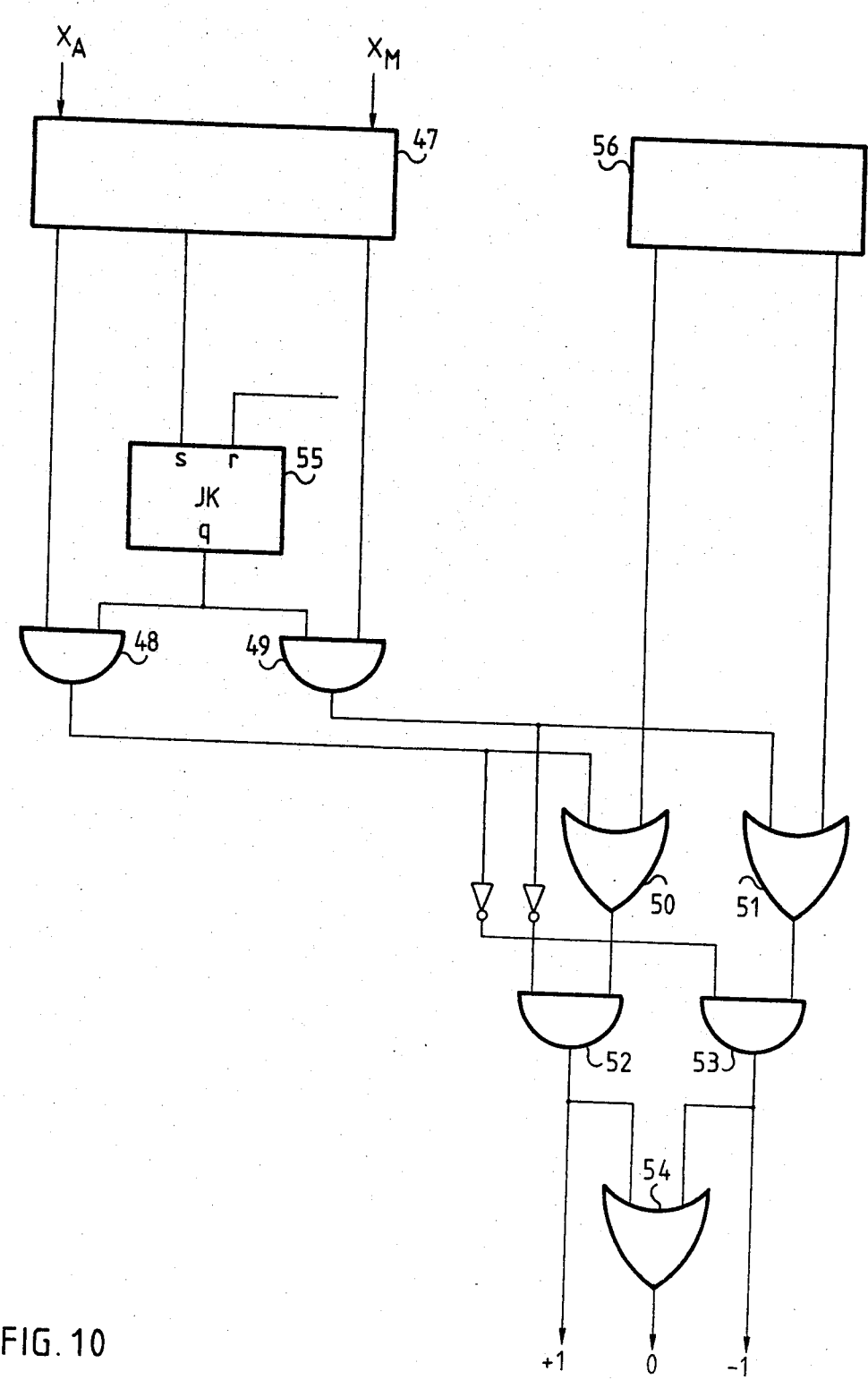
FIG. 10 is a block diagram of the system for servo-controlling the speed and position of the carriage bearing the print head.

In FIG. 10 is shown a block diagram of a preferred embodiment for servo-controlling the speed and position of carriage 2 bearing print head 3. In effect, in the printer, it is desirable to be able to bring the print head 3 to a stop at a precise position after having moved it at a given speed. The system permitting this servo-control is the same as the preceding speed servo-control system, together with a position servo-control. The principle is as follows: with print head 3 being supposedly located at a point M (variable abscissa $x_M$) and moving towards point A at abscissa $x_A$ at speed V, the system servo-controlling the speed which has already been described is permitted to operate on its own as long as the point A has not been passed. When print head 3 reaches point A, a positioning system, described infra with regard to FIG. 10, moves the head to position A in the following manner.

If the difference $x_A - x_M$ is positive, a "forcing to $+1$" is carried out, that is, the voltage fed to an amplifier which controls the current for winding 6 is established at a voltage $+U$. If the difference $x_A - x_M$ is negative, a "forcing to $-1$" is established, whereby the amplitude is supplied with a voltage of $-U$. Once the objective has been obtained, the forcings are returned to 0.

The system used for this purpose comprises a comparator 47, which compares signals representing $x_M$ and $x_A$ and delivers at its outputs signals corresponding to the states (1) $x_A - x_M$ greater than 0, (2) $x_A - x_M$ less than 0, (3) $x_A = x_M$; one of the three signals is supplied to a network including AND logic gates 48 and 49, OR gates 50 and 51, AND gates 52 and 53, OR gate 54 and several inverters, as well as JK flip-flop 55. The network is also responsive to the $+1$ and $-1$ signals from speed control network 58, as illustrated in FIG. 8. The outputs of the FIG. 10 network designated as $+1$, $-1$ and 0 control the amplifier (not shown) for the motor servo-control module which derives signals to increase, decrease and maintain constant the current of winding 6.

While there has been described and illustrated one specific embodiment of the invention, it will be clear that variations in the details of the embodiments specifically illustrated and described may be made without departing from the true spirit and scope of the invention as defined in the appended claims.

I claim:

1. A dot type printer comprising a printing head, a carriage carrying the head, an elongated guide rail having a high magnetic permeability, the carriage being mounted on the guide rail so the carriage can be translated longitudinally along the guide rail, a drive system for longitudinally translating the carriage along the guide rail, said drive system including: means for establishing a magnetic field with magnetic lines of flux extending, at right angles to the guide rail elongated direction, through an air gap, a winding wound on said carriage to produce magnetic field in the same direction as the elongated direction of the guide rail in response to current being applied to the winding, whereby the magnetic field from the winding interacts with the permanent magnetic lines of flux to produce a force to translate the carriage along the rail, the printing head including plural printing hammers, a coil for controlling activation of each hammer, the coil controlling the activation of each hammer being disposed in the air gap so as to be responsive to the magnetic lines of flux, whereby a magnetic field resulting from current being supplied to a particular coil interacts with the magnetic lines of flux to produce a force to activate the hammer associated with the particular coil.

2. The printer of claim 1 wherein each coil includes a metal spiral situated in a plane perpendicular to the magnetic lines of flux, each spiral being at least partly in the air gap.

3. The printer of claim 2 wherein each spiral spring has a pivot axis about which the spring pivots, each pivot axis extending in the same direction as the magnetic lines of flux and at right angles to the direction of movement of the carriage along the guide rail, the print hammer associated with each coil being mounted on the spiral associated with the coil at a point remote from the pivot axis, each spiral having a flat face at right angles to the magnetic lines of flux.

4. A dot type printer comprising a printing head, a carriage carrying the head, an elongated guide rail having a high magnetic permeability, the carriage being mounted on the guide rail so the carriage can be translated longitudinally along the guide rail, a drive system for longitudinally translating the carriage along the guide rail, said drive system including: a yoke having high magnetic permeability portions, said yoke including the guide rail, a permanent magnet, a first magnetic pole face for the permanent magnet contacting a portion of the yoke to maintain the guide rail at the first magnetic polarity, a second magnetic pole face for the permanent magnet being spaced from all high magnetic permeability portions of the yoke, the second pole face being elongated and extending substantially throughout the distance travelled by the carriage in a direction parallel to the elongated direction of the guide rail, an air gap for magnetic lines of flux of the permanent magnet being formed between the guide rail and the second pole face whereby the magnetic lines of flux are at right angles to the direction of travel of the carriage along the elongated direction of the guide rail, a winding wound on said carriage to produce a magnetic field in the same direction as the elongated direction of the guide rail in response to current being applied to the winding, whereby the magnetic field from the winding interacts with the permanent magnetic lines of flux to produce a force to translate the carriage along the rail, wherein the printing head comprises plural printing hammers, a coil for controlling activation of each hammer, the coil controlling the activation of each hammer being disposed in the air gap so as to be permanently responsive to the magnetic lines of flux of the permanent magnet, whereby a magnetic field resulting from current being supplied to a particular coil interacts with the permanent magnetic lines of flux to produce a force to activate the hammer associated with the particular coil.

5. A dot type printer comprising a printing head, a carriage carrying the head, an elongated guide rail having a high magnetic permeability, the carriage being mounted on the guide rail so the carriage can be translated longitudinally along the guide rail, a drive system for longitudinally translating the carriage along the guide rail, said drive system including: a yoke having high magnetic permeability portions, said yoke including the guide rail, a permanent magnet, a first magnetic pole face for the permanent magnet contacting a portion of the yoke to maintain the guide rail at the first magnetic polarity, a second magnetic pole face for the permanent magnet being spaced from all high magnetic permeability portions of the yoke, the second pole face being elongated and extending substantially throughout the distance travelled by the carriage in a direction parallel to the elongated direction of the guide rail, an air gap for magnetic lines of flux of the permanent magnet being formed between the guide rail and the second pole face whereby the magnetic lines of flux are at right angles to the direction of travel of the carriage along the elongated direction of the guide rail, a winding wound on said carriage to produce a magnetic field in the same direction as the elongated direction of the guide rail in response to current being applied to the winding, whereby the magnetic field from the winding interacts with the permanent magnetic lines of flux to produce a force to translate the carriage along the rail, wherein the printing head comprises plural printing hammers and a coil for controlling activation of each hammer, the coils controlling the activation of the hammers being disposed in the air gap so as to be permanently responsive to the magnetic lines of flux of the permanent magnet, each coil comprising a metal spiral situated in a plane perpendicular to flux lines of the permanent magnet, each spiral being at least partly in the air gap, whereby a magnetic field resulting from current being supplied to a particular coil interacts with the permanent magnetic lines of flux to produce a force to activate the hammer associated with the particular coil.

6. The printer of claim 5 wherein each spiral spring has a pivot axis about which the spring pivots, each pivot axis extending in the same direction as the permanent magnetic lines of flux and at right angles to the direction of movement of the carriage along the guide rail, the print hammer associated with each coil being mounted on the spiral associated with the coil at a point remote from the pivot axis, each spiral having a flat face at right angles to the permanent magnetic lines of flux.

7. The printer of claim 4, 5 or 6 wherein the high magnetic permeability yoke is closed, the permanent magnetic being enclosed by the closed yoke, said first permanent magnet pole face abutting against a portion of the yoke remote from the guide rail, whereby flux from the one permanent magnet pole face is coupled to the guide rail by the yoke.

8. The printer of claim 7 wherein said second permanent magnet pole face includes a high magnetic permeability pole piece between the first permanent magnet pole face and the guide rail and extending in the same direction as the rail and in spaced relation with the rail.

* * * * *